May 15, 1934.  C. I. NYGARD  1,959,213
CLUTCH PLATE
Filed Dec. 2, 1932
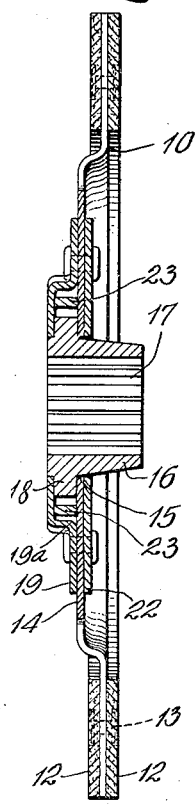
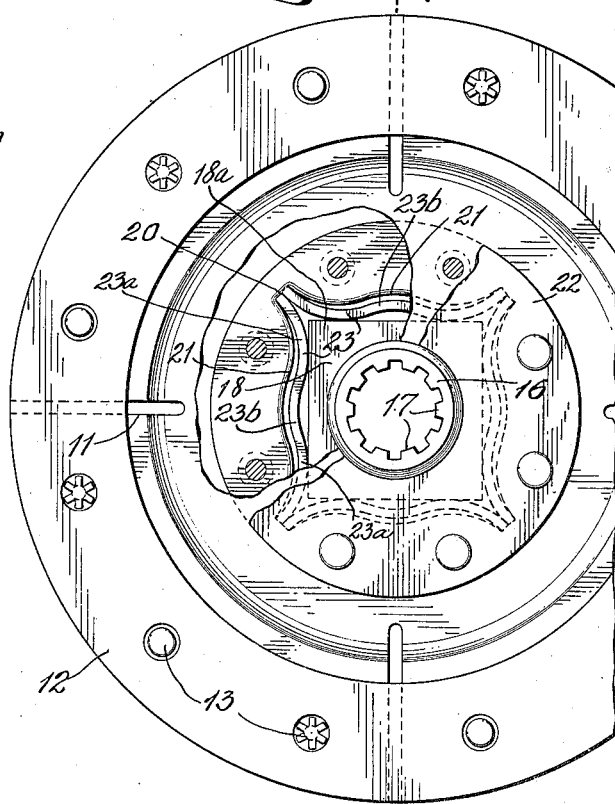
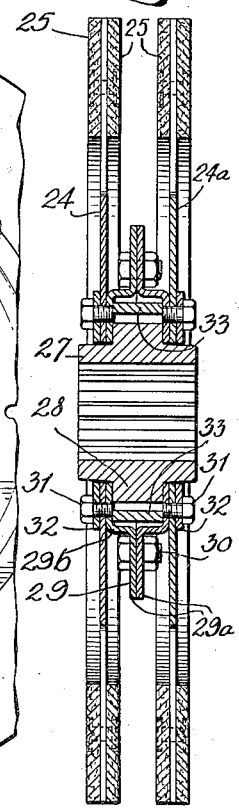
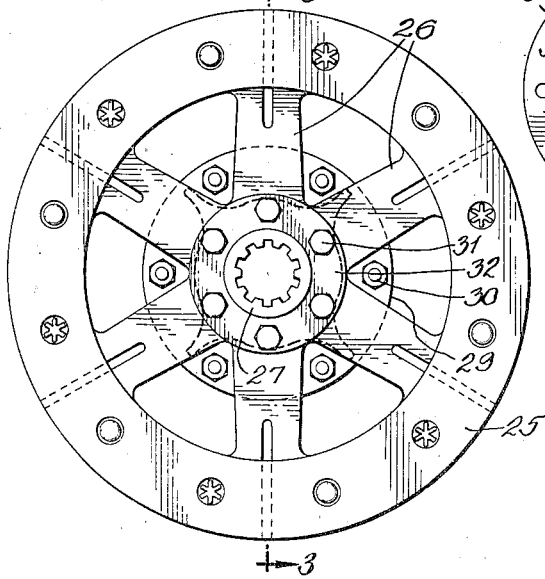
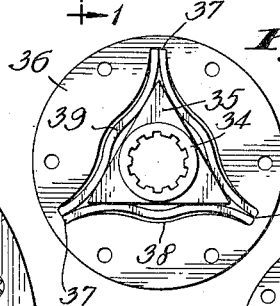
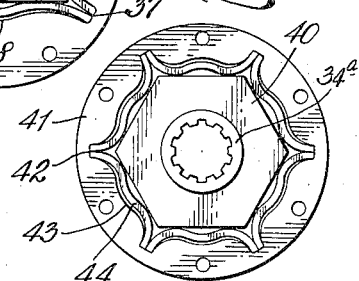
INVENTOR.
Charles I. Nygard
BY
Howard E. Thompson
ATTORNEY.

Patented May 15, 1934

1,959,213

UNITED STATES PATENT OFFICE 1,959,213

CLUTCH PLATE

Charles I. Nygard, Elmhurst, N. Y.

Application December 2, 1932, Serial No. 645,359

17 Claims. (Cl. 192—68)

This invention relates to the drive or driven plate of clutches used in coupling the engine and transmission of motor vehicles; and the object of the invention is to provide a full floating clutch plate having a spring connection or coupling between the plate proper and hub which will afford positive clutch engagement without experiencing vibration, chatter, tremor or jar, and further, which will prevent what is known as back lash; a further object being to provide a clutch plate of the class described employing elongated flat springs curved centrally and at the end portions thereof so as to provide spring engagement with both corner portions of an angular hub and to provide the smoothest as well as strongest resilient engagement between the hub and plate proper; a still further object being to provide springs of the class described which are mounted in position between the hub and plate under slight tension so as to insure positive engagement between the hub and plate at all times; and with these and other objects in view, the invention consists in a clutch plate of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view through a plate made according to my invention, the section being on the line 1—1 of Fig. 2.

Fig. 2 is a face view of the plate with parts of the construction broken away and in section.

Fig. 3 is a view similar to Fig. 1 showing a dual plate construction, the section being on the line 3—3 of Fig. 4.

Fig. 4 is a face view of the plate shown in Fig. 3; and,

Figs. 5 and 6 are detail views of parts of other plates showing modifications.

In Figs. 1 and 2 of the drawing, I have shown one form of plate which I employ which consists of a disk 10, the periphery of which is split at spaced intervals as seen at 11 and to opposite side faces of the disk are secured fibrous or other facings 12 secured in place by rivets or the like 13.

The central portion 14 of the disk 10 is offset and provided with an opening 15 to receive a hub 16, the bore of which is provided with a plurality of teeth or projections 17 whereby the hub may be keyed to the usual shaft. On the hub 15 is an outwardly projecting flange 18 which in the construction shown is square in form so as to provide four right angle corner portions 18a.

Riveted or otherwise secured on the side of the central portion 14 of the plate 10 on which the flange 18 is arranged is a supplemental plate or disk 19, the part 19a of which is offset and of the curved and angular contour indicated in Fig. 2 of the drawing to form a socket or chamber for receiving the flange 18 and with clearance around the flange 18 to form a continuous chamber having four corner portions 20 arranged in alignment with the corner portions 18a of the flange 18, and joining the corner portions, the walls of the offset part 19a are curved as seen at 21. In securing the disk 19 in position, I also preferably employ a reinforcement ring 22 which is disposed on the opposite side of the part 14 as clearly seen in Fig. 1 of the drawing so as to reinforce and strengthen the hub portion of the plate 10.

Arranged between the flange 18 and the walls 21 and corners 20 is a plurality of flat curved springs 23, the ends of said springs being fashioned to enter the corners 20, one end of each of adjacent springs being arranged in each corner and fitting snugly therein. Adjacent the corner portions, the springs are curved inwardly as seen at 23a to engage the flange 18 adjacent the corners 18a and centrally, the springs are curved outwardly as seen at 23b.

Normally, the springs 23 are placed between the flange 18 and the part 19a of the disk 19 under a slight tension so that the curved portions 23a thereof tensionally engage the flange 18. It will be noted, however, that the central curved portions 23b as well as the outer surfaces of the springs do not engage the curved inner walls 21 of the offset 19a so as to provide for the flexure of the spring. It will be noted on a consideration of Fig. 2 of the drawing that in the rotation of the hub 15, including the flange 18 in either a forward or reverse direction, one side wall of each corner portion 18a will be moved into engagement with one of the curved ends 23a of the springs to flex said springs outwardly, in which operation, the other curved ends of the springs will be flexed inwardly maintaining engagement with the flange 18, thus insuring smooth clutching engagement between the engine and transmission and preventing any possible vibration, chattering, tremor or jarring and also eliminating what is known as back lash.

In Figs. 3 and 4 of the drawing, I have shown a modified form of construction adapted for use in the manufacture of dual clutch plates. In this construction, I employ two similar plates 24, 24a, each plate having fibrous facings 25 on the periphery thereof, similar to the facings 12, the hub portions of the plates joining the peripheral portions in a plurality of spokes or webs 26, note Fig. 4 of the drawing.

The hub 27 differs from the hub 15 in having the flange portion 28 thereof arranged centrally of the hub and of greater width than the flange 18. With this construction, two disks 29, similar to the disks 19, are arranged with the outer flange portions 29a thereof abutting and coupled together by bolts 30 disposed between the spokes 26 as seen in Fig. 4, and the central offset portions 29b of said disks extend outwardly and engage the hub portions of the plates 24, 24a, and are secured thereto by screws or the like 31, which also pass through reinforcing rings 32. As each plate 24, 24a, is of similar construction, the brief description of one applies to the other. In this connection, it will also be understood that the offset parts 29b of the disks 29 are similar to the offset parts 19a of the disks 19 and form a chamber or socket for springs 33, similar in all respects to the springs 23, with the exception that the width of the springs 33 is greater to compensate for the greater width of the flange 28, as will be apparent, and the operation of the dual disk will be the same as that of the single disks shown in Figs. 1 and 2 of the drawing.

Instead of providing a rectangular flange on the hub portion of the disk as in Figs 1 to 4 inclusive, these flanges may be modified to produce other angular contours. In Fig. 5 of the drawing, I have shown the hub portion 34 as provided with a triangular flange 35. With this construction, the disk 36 which will be equivalent to the disks 19 and 29, has a triangular offset therein, forming the three corner portions 37, the three curved walls 38, and three springs 39 of the same general contour as the springs 23 and 33 are arranged between the flange 35 and the walls 37 and 38 of the plate 36.

In Fig. 6 of the drawing, I have shown a hub portion 34a provided with a hexagonal flange 40. With this construction, the disk 41 has six corner portions 42 and six curved sides 43, and six springs 44 are employed. In all cases and regardless of the upper angular contour of the flange of the hub portion, the curved ends of each spring will engage the angular corners of the flange to provide a resilient engagement between the hub and disk in both forward and reverse drives of the engine.

It will be understood, at this time, that with the several types of clutch plates shown and described, the number of springs employed and the size and construction thereof will be governed by the size or weight of the vehicle in connection with which they are employed. It will also be understood that while I have shown clutch plates and hubs of specific construction, I am not necessarily limited to the specific structure of these devices as shown, and various other changes in and modifications of the clutch plates herein shown and described may be made within the scope of the appended claims without departing from the spirit of my invention or sacrificing its advantages.

Having fully described my invention, what I claim as new and desire to secure by Letters Patent, is:

1. A clutch device of the class described comprising a hub portion having an angular flange and a plate mounted on the hub portion and including a socket in which said flange is located, the inner walls of said socket being arranged in spaced relation to the outer walls of said flange, and flat springs disposed between said spaced walls, the ends of said springs seating in said plate, and the end portions of the springs being curved and tensionally engaging said flange adjacent the intersections of the angular walls thereof during all drives between the hub and plate.

2. A clutch device of the class described comprising a hub portion having an angular flange and a plate mounted on the hub portion and including a socket in which said flange is located, the inner walls of said socket being arranged in spaced relation to the outer walls of said flange, flat springs disposed between said spaced walls, the ends of said springs seating in said plate and the end portions of the springs being curved and tensionally engaging said flange adjacent the intersections of the angular walls thereof, and the central portions of said springs being curved outwardly away from the walls of said flange.

3. A clutch device of the class described comprising a hub portion having an angular flange and a plate mounted on the hub portion and including a socket in which said flange is located, the inner walls of said socket being arranged in spaced relation to the outer walls of said flange, flat springs disposed between said spaced walls, the ends of said springs seating in said plate and the end portions of the springs being curved and tensionally engaging said flange adjacent the intersections of the angular walls thereof, the central portions of said springs being curved outwardly away from the walls of said flange, and the walls of said socket intermediate the ends of the springs being normally in spaced relation to the curved portions of the springs.

4. A clutch device of the class described comprising a plate, a hub portion centrally of said plate and including an outwardly extending flange of angular cross sectional form to provide a plurality of corner portions, a supplemental plate on said first named plate and enveloping the flange of said hub, said supplemental plate being fashioned to form a socket, the inner walls of which are arranged in spaced relation to the outer walls of said flange, said socket having corner portions disposed in alinement with the corner portions of said flange, and a plurality of flat curved springs arranged in said socket outwardly of the angular walls of said flange, the ends of adjacent springs seating in the corner portions of said sockets, and the end portions of the springs being curved inwardly to tensionally engage the corner portions of said flange.

5. A clutch device of the class described comprising a plate, a hub portion centrally of said plate and including an outwardly extending flange of angular cross sectional form to provide a plurality of corner portions, a supplemental plate on said first named plate and enveloping the flange of said hub, said supplemental plate being fashioned to form a socket, the inner walls of which are arranged in spaced relation to the outer walls of said flange, said socket having corner portions disposed in alinement with the corner portions of said flange, a plurality of flat curved springs arranged in said socket outwardly of the angular walls of said flange, the ends of adjacent springs seating in the corner portions of said sockets, the end portions of the springs being curved inwardly to tensionally engage the corner portions of said flange, and the central portions of said springs being curved outwardly and spaced from said flange.

6. A clutch device of the class described comprising a plate, a hub portion centrally of said plate and including an outwardly extending flange of angular cross sectional form to provide a plurality of corner portions, a supplemental plate on said first named plate and enveloping the flange of said hub, said supplemental plate being fashioned to form a socket, the inner walls of which are arranged in spaced relation to the outer walls of said flange, said socket having corner portions disposed in alinement with the corner portions of said flange, a plurality of flat curved springs arranged in said socket outwardly of the angular walls of said flange, the ends of adjacent springs seating in the corner portions of said sockets, the end portions of the springs being curved inwardly to tensionally engage the corner portions of said flange, the central portions of said springs being curved outwardly and spaced from said flange, and the walls of said socket being normally spaced from said spring intermediate said corner portions.

7. In a drive clutch plate employing a friction disk and a full floating hub, a plurality of flat curved springs for establishing a drive connection between the hub and disk, each of said springs comprising a comparatively wide strip of thin spring metal curved transversely to provide inwardly curved end portions and an outwardly curved central portion, the ends of the inwardly curved end portions extending outwardly in flared relation.

8. In a clutch plate of the class described having a full floating hub including a projecting flange with angularly disposed outer walls, means for supporting a plurality of curved flat springs outwardly of said angularly disposed walls to provide positive resilient driving engagement between the hub and plate and the curvature of said springs establishing tensional engagement between the flange and said supporting means.

9. In a clutch plate of the class described having a full floating hub including a projecting flange with angularly disposed outer walls, means for supporting a plurality of curved flat springs outwardly of said angularly disposed walls to provide positive resilient driving engagement between the hub and plate, the ends of said springs tensionally engaging the flange of said hub at all times and in the forward and reverse drive of the hub.

10. In a clutch plate of the class described having a full floating hub including a projecting flange with angularly disposed outer walls, means for supporting a plurality of curved flat springs outwardly of said angularly disposed walls to provide positive resilient driving engagement between the hub and plate, and said plate consisting of two friction disks arranged in spaced and parallel relation with respect to each other.

11. In a clutch plate having a floating hub portion provided with a projecting flange including angularly arranged walls, a chamber formed in the plate to receive said flange, said chamber having corner portions in alinement with the corner portions of the angular flange and the inner walls of the chamber between said corner portions being curved inwardly and outwardly.

12. In a clutch plate having a floating hub portion provided with a projecting flange including angularly arranged walls, a chamber formed in the plate to receive said flange, said chamber having corner portions in alinement with the corner portions of the angular flange and the inner walls of the chamber between said corner portions being curved inwardly and outwardly, and a curved spring disposed between each curved inner wall of said chamber and an adjacent angular wall of said flange and tensionally engaging the flange wall adjacent the corner portions thereof.

13. In a clutch plate having a floating hub portion provided with a projecting flange including angularly arranged walls, a chamber formed in the plate to receive said flange, said chamber having corner portions in alinement with the corner portions of the angular flange and the inner walls of the chamber between said corner portions being curved inwardly and outwardly, a curved spring disposed between each curved inner wall of said chamber and an adjacent angular wall of said flange and tensionally engaging the flange wall adjacent the corner portions thereof, and the ends of said spring seating in the corner portions of said chamber.

14. A clutch device of the class described comprising a plate, a floating hub portion centrally of the plate, said hub portion having arranged circumferentially thereof angularly disposed walls, the plate including walls disposed outwardly of and in spaced relation to the walls of said hub, elongated springs arranged in the space between said walls, and the end portions of said springs being fashioned to tensionally engage the opposed walls of the plate and hub at all times to provide a yielding drive connection with the hub and plate and to obviate back lashing through the clutch device.

15. A clutch device of the class described comprising a plate, a floating hub portion centrally of the plate, said hub portion having arranged circumferentially thereof angularly disposed walls, the plate including walls disposed outwardly of and in spaced relation to the walls of said hub, elongated springs arranged in the space between said walls and the end portions of said springs being fashioned to tensionally engage the opposed walls of the plate and hub at all times to provide a yielding drive connection with the hub and plate and to obviate back lashing through the clutch device, and the fashioning of the ends of the springs consisting in curving said ends transversely with respect to opposed walls of the hub and plate.

16. A clutch device of the class described comprising a plate, a floating hub portion centrally of the plate, said hub portion having arranged circumferentially thereof angularly disposed walls, the plate including walls disposed outwardly of and in spaced relation to the walls of said hub, elongated springs arranged in the space between said walls and the end portions of said springs being fashioned to tensionally engage the opposed walls of the plate and hub at all times to provide a yielding drive connection with the hub and plate and to obviate back lashing through the clutch device, the fashioning of the ends of the springs consisting in curving said ends transversely with respect to opposed walls of the hub and plate, and said plate including corner portions in which the ends of adjacent springs seat in abutting relation with respect to each other.

17. In a device of the class described, a drive member including projecting elements, a driven member arranged on the drive member and including portions disposed adjacent and in spaced relation to said projecting elements of the drive member, and elongated springs disposed in the space between the projecting elements and said portions, said springs being fashioned to tensionally engage the projecting elements and said portions at all times and to form a yielding drive connection between the drive member and said driven member.

CHARLES I. NYGARD.